United States Patent [19]

Armani

[11] Patent Number: 5,786,106
[45] Date of Patent: Jul. 28, 1998

[54] BATTERY PACK WITH INTERCHANGEABLE TAG-ALONG SUPPLEMENTAL FEATURE CARTRIDGE PARTICULARLY FOR CELLULAR TELEPHONES

[76] Inventor: Shane Armani, 20945 Devonshire #105, Chatsworth, Calif. 91311

[21] Appl. No.: 669,213

[22] Filed: Jun. 24, 1996

[51] Int. Cl.⁶ ................................. H01M 2/10
[52] U.S. Cl. .......................... 429/98; 429/100
[58] Field of Search ............... 429/96–100, 121, 429/7, 8; D14/142, 143; 379/59; 455/89, 90, 127; 361/679, 434, 728

[56] References Cited

U.S. PATENT DOCUMENTS

| | | | |
|---|---|---|---|
| 4,389,469 | 6/1983 | Nicholls | 429/98 |
| 5,001,772 | 3/1991 | Holcomb | 455/90 |
| 5,225,760 | 7/1993 | Leiserson | 320/2 |
| 5,472,804 | 12/1995 | Austin et al. | 429/99 |
| 5,607,791 | 3/1997 | Garcia et al. | 429/96 |
| 5,626,980 | 5/1997 | Ruth et al. | 429/100 |
| 5,631,101 | 5/1997 | Amero, Jr. | 429/97 X |
| 5,637,417 | 6/1997 | Engmark et al. | 429/97 |
| 5,661,392 | 8/1997 | Imazeki | 429/96 X |

OTHER PUBLICATIONS

Miniature Card Implementers Forum Web: http://www.mci-f.org/fags.html (no date).

*Primary Examiner*—Anthony Skapars

[57] ABSTRACT

A battery pack that comprises a removable supplemental feature cartridge (160). These features can be answering machines, electronic appointment calendars, clock radios, digital recorders, garage door openers, timers, silent alarm vibrators or other items that would be beneficial to keep close at hand. These tag-along cartridges are standardized in size and can be used on battery packs that fit many different cellular telephones and other portable personal communication devices. The cartridges can receive electrical power from or deliver power to the battery pack. Since the cartridges need not contain their own separate battery, the cartridges are sufficiently small and light weight so that several cartridges can be carried in a shirt pocket or purse and be quickly inserted into the battery pack. Cartridges can be quickly switched from a battery pack that is about to be placed on a charger to a fresh battery pack that has just been mounted on a cellular phone.

14 Claims, 6 Drawing Sheets

BATTERY PACK WITH INTERCHANGEABLE TAG-ALONG SUPPLEMENTAL FEATURE CARTRIDGE PARTICULARLY FOR CELLULAR TELEPHONES

BACKGROUND OF THE INVENTION

1. Field of the Invention

The present invention relates to the field of battery packs and more particularly to an apparatus and method for adding an interchangeable supplemental feature or function cartridge to a battery pack such as those used in cellular telephones and other portable personal communication devices for the purpose of adding one or more supplemental features to the battery pack.

2. Description of the Related Art

Portable cellular telephones and other portable personal communication devices are rapidly becoming common place. Indeed, in many businesses, portable cellular telephones have become a necessity. The cellular telephone has shrunk in size to the point where it can now fit into the palm of the hand or the shirt pocket. Similar improvements have been seen in the other portable personal communication devices as well. Since the cellular telephone's size has been reduced it has become easier to keep the telephone within easy reach and it is desirable to add convenience features to it. These improvements have been accompanied by improvements in portable cellular telephone power source. Presently available power sources are usually comprised of a plurality of individual cells connected in series to yield a total voltage of about six volts. Rather than replace each of the battery cells one at a time, the battery pack was used which allowed all battery cells to be replaced at one time. One battery pack could be charged while another one was being used.

U.S. Pat. No. 4,389,469 issued Jun. 21, 1983, to Nicholls describes one of the earliest battery packs which was used for children's toys. That battery pack was sealed to prevent children from substituting a non-chargeable battery and attempting to charge it. That battery pack did comprise a primary function but it did not comprise a secondary or supplemental function.

U.S. Pat. No. 5,001,772 issued Mar. 19, 1991, to Holcomb et al. describes one of the earliest portable cellular telephone battery packs with a dual purpose. The battery pack concealed a radio transmitter for law enforcement. This secondary function was permanently attached to the battery pack; it therefore spent about half of its useful life on a battery charger.

U.S. Pat. No. 5,225,760 issued Jul. 6, 1993, to Leiserson shows a general purpose battery pack with the batteries attached to the cover of the battery compartment. The opening in the compartment was sized such that the batteries could fit through the opening. This battery pack had no secondary function.

Dual functions like the concealed transmitter mentioned above or a message recorder battery pack are just two of the possible items that could be attached to the portable cellular telephone battery pack and be kept close at hand. If a list were made of these items, that list would be quite lengthy. It would contain personal items that would vary from individual to individual along with more standard items. Combinations of two or more functions are also desirable. Clearly designing a different battery pack to serve as a carrier for each these items would be a difficult and expensive endeavor for both the manufacture and the consumer. The less popular items simply could not be included due to the expense of retooling the battery pack specifically for their use.

All the prior art battery packs are shown with either no secondary function or only one fixed secondary function. Ideally supplemental or tag-along function(s) could be attached or removed in a couple of seconds and not spend half of its useful life on a charger which could necessitate purchasing two of the same function. This gap between the ideal and the prior art needs to be dealt with.

One of the largest and heaviest components of portable cellular telephones and other portable personal communication devices is the battery pack. The weight and size of supplemental function(s) do not represent a significant increase in weight or size. For this reason the battery pack is the ideal carrier of these supplemental functions. The battery pack can also receive power from the supplemental function(s).

The Miniature Card Implementers Forum recently announced that their digital data storage memory cards could be used with many different devices. These cards will be used to extend digital memory in devices and to transport digital data between devices. In the future these devices will probably include digital cellular telephones but not the currently popular analog cellular telephones. The forum has published a preliminary specification and has also created an update document to that specification. This card appears to be an interesting and useful proposal. The card will use a 60 wire connection with a 16 bit data bus. Due to the number of connections that the miniature card would make with the telephone and the extra wire length, it would not be practical to connect it to the battery pack and break these connections twice (once for the connection to the miniature card and once for the connection from the pack to the telephone) each time the battery pack was removed.

In summary, there is a need to securely attach items to or place items in the portable cellular telephones and other portable personal communication devices in order to keep those items conveniently close at hand. The battery pack is the ideal carrier for these items. Items should be easily added to or removed from the battery pack in seconds so that the items can be switched from a discharged pack to a charged pack with ease.

In general, prior art battery packs contain at most one secondary function that must remain attached to the battery pack while it is being charged and hence must remain out of service for about half of its useful life. Likewise, a user must either buy two battery packs with the desired function or do without that function while the associated battery pack is charging. A concern is raised that this can cause a significant waste of resources and have an adverse impact on the environment due to the enormous number of cellular telephones and other portable personal communication devices that are expected to exist in the future, the large number of possible supplemental features and, the desire to have these functions on two or more packs per cellular telephone or other portable personal communication device. It would not be environmentally desirable to entice the consumer into buying up to two or more potentially unneeded battery packs to get the use of one specific supplemental function. Indeed, the purchase of rechargeable batteries ideally would be independent of any purchase of supplemental functions.

Objects and Advantages of the Invention

An object of this invention is to provide an inexpensive battery pack that provides an apparatus and method for attaching an interchangeable supplemental device or function cartridge. This is accomplished by providing a docking slot and supplemental function cartridges. These device cartridges can be any combinations of optical, electrical, electronic and/or mechanical functions. These device cartridges can comprise functions or function means as diverse as alarms, alarm clocks, digital answering machines, garage door openers, hand free kits, key and pill storage, laser pointers, pagers, radios, radio frequency (rf) child finders, rf phone finders, rf cellular phone theft alarms, silent ring vibrators, sun UV monitors, thermometers, timers, ultrasonic distance measuring devices, etc. Combinations of two or more functions would also be desirable, such as a rf child finder, rf phone finder, and a rf phone theft alarm combination (all three would sound an alarm if a certain distance between the cell phone and a remote unit were exceeded or if a button was pressed). Prior art portable battery packs do not allow for removing and inserting supplemental functions.

A further object of the present invention is to provide standardized slot sizes for the device cartridges. It can be reasonably assumed that the sizes of cellular telephones and other portable personal communication devices will continue to shrink and so eventually must their cartridges. This standardization will allow separate purchase of the cartridges and interchangeability of the cartridges between phones of different manufacture within the same cartridge footprint or cartridge size. These same cartridges can also be used in battery pack of other devices. Currently two cartridge footprints or standard sizes are apparent. The first footprint fits the MicroTac™ which is a trade mark of Motorola, Inc. and it also fits most other cellular phones (at the present time). The second footprint fits only the Ericsson (at the present time). The Ericsson footprint is the smaller of the two and is expected to become increasingly popular. In the fixture the Ericsson footprint is expected to give way to a third and yet smaller footprint and so on. Since the cartridges are interchangeable within a footprint, the cost of each device cartridge is lowered by not designing and manufacturing many different cartridges to carryout the same function. Prior art battery packs can not meet this need.

Yet another object of the present invention is to provide a built in flashlight as a third function. Prior art battery packs do not typically supply a built in flashlight.

Still another object of the present invention is to provide for fast removal and insertion of the device cartridge. Several device cartridges could be stored in a pocket or purse and quickly substituted for the currently docked cartridge. The cartridge also could quickly be removed from a battery pack about to be placed into a charger and placed on a freshly charged battery pack.

A further object of the present invention is to provide a cartridge for the battery pack which can draw on the battery pack for its power and thus enable a significant increase in volume available to the supplemental function(s) within the cartridges. It would also reduce the number of batteries needing manufacture and disposal.

The primary advantage of the present invention over the prior art, involves deriving all of the benefits of the many different supplemental functions for the cellular telephone battery pack and other portable device battery packs without the expense of designing and manufacturing two battery packs for each function. It would also reduce the environmental impact of the manufacturing and disposal of unneeded batteries. This is accomplished by using removable device cartridges that are inserted into the cellular telephone or other portable device battery pack to create the supplemental functions.

A further advantage of the present invention is that the cartridges are small and light in weight enabling several different functions to be carried in a shirt pocket or a purse. This is accomplished by allowing the device cartridges to use the packs' batteries for their power and thus eliminating the need for a battery in the cartridges. This also would further reduce the number of batteries needing manufacture and disposal.

Further objects and advantages of this invention will become apparent to those skilled in the art from consideration of the following description with reference given to the appended drawings.

DETAILED DESCRIPTION OF THE PREFERRED EMBODIMENT OF THE INVENTION

Figure 1:
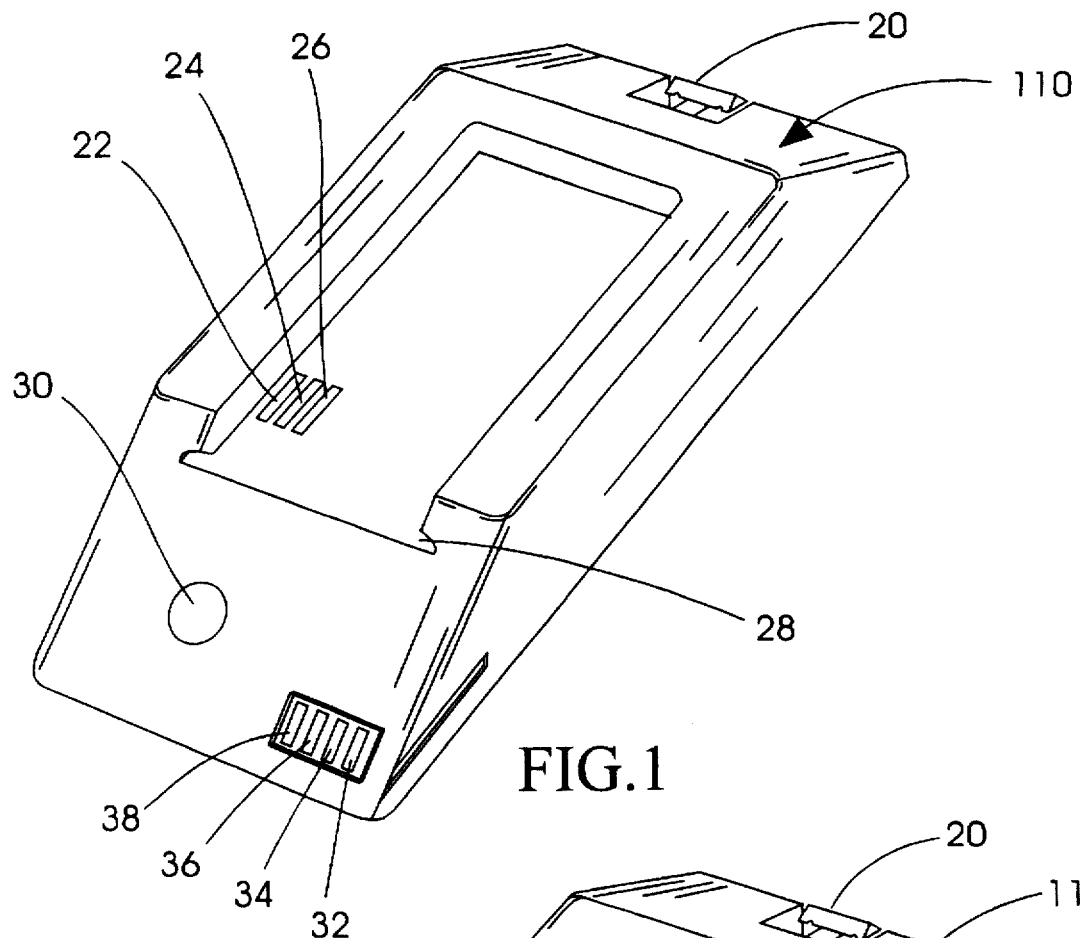
FIG. 1 is a perspective view of the main body of the preferred embodiment of the invention which is a battery pack that fits the Motorola MicroTac™ cellular telephone without a cartridge inserted.
Figure 2:
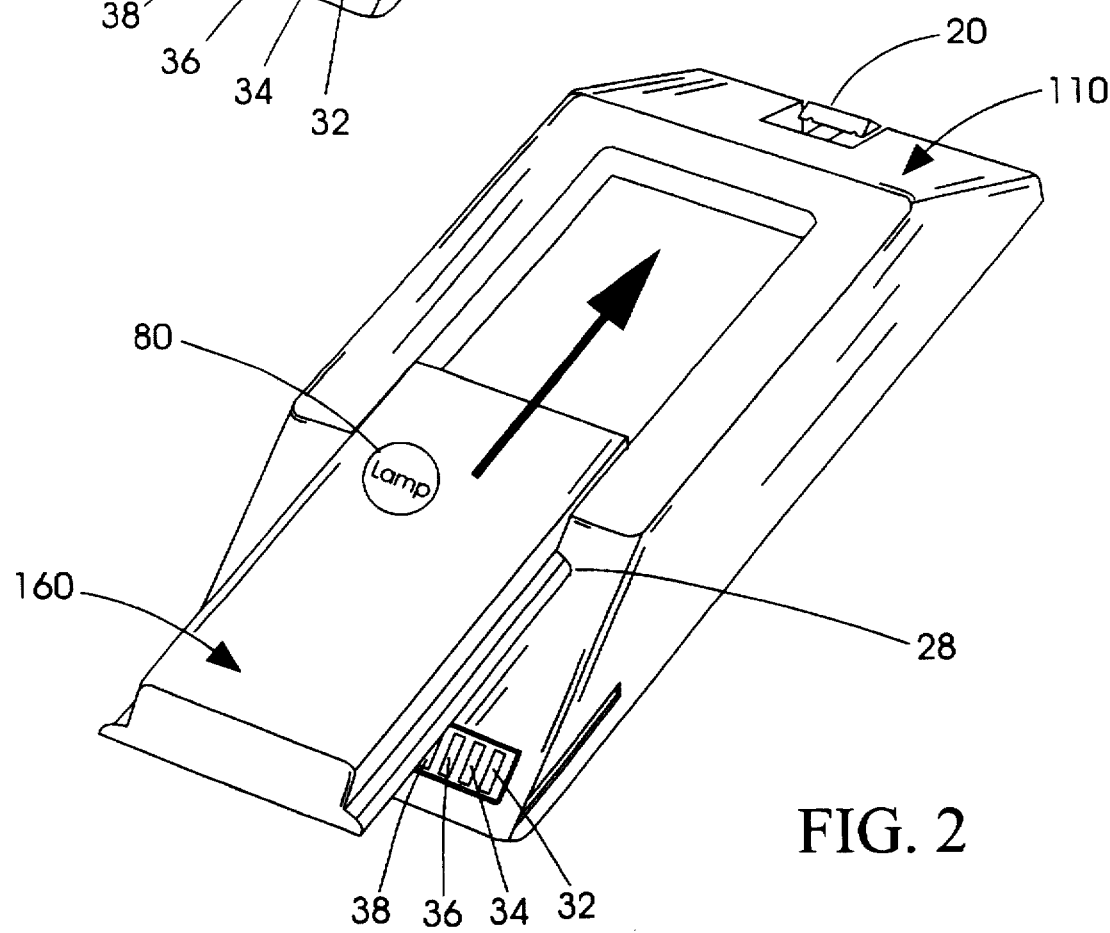
FIG. 2 is a perspective view of the preferred embodiment of the invention with a cartridge partially inserted.

Reference is now directed to FIG. 1 and FIG. 2, which are perspective views of the preferred embodiment of the invention which is a battery pack 110 that fits the Motorola MicroTac™ cellular telephone. A slot 28 provides a docking means or an attachment means or loading section for loading a removable functional cartridge 160 on battery pack 110. Battery pack 110 is shown without a functional cartridge 160 inserted into slot 28 in FIG. 1 and with cartridge 160 partially inserted into slot 28 in FIG. 2.

Figures 9, 10:
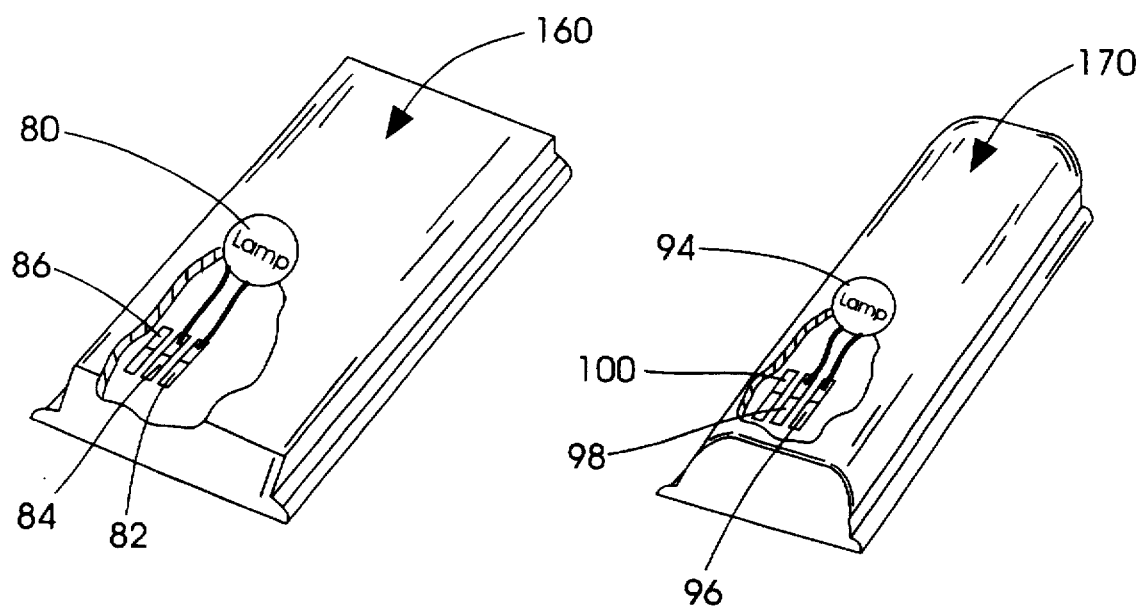
FIG. 9 is a perspective view of a cartridge that fits the MicroTac™ footprint.
FIG. 10 is a perspective view of a cartridge that fits the Ericsson footprint.

A contact 22 shown in FIG. 1 makes contact with a contact 86 shown in FIG. 9 on the under side of cartridge 160 to connect the ground or negative voltage between battery pack 110 and cartridge 160. A contact 24 shown in FIG. 1 makes contact with a contact 84 shown in FIG. 9 on the under side of cartridge 160 to connect a lamp 74 shown in FIG. 3B with a lamp switch 80 shown in FIG. 2 on cartridge 160. A contact 26 shown in FIG. 1 makes contact with a contact 82 on the under side of cartridge 160 shown in FIG. 9 to connect the positive voltage between battery pack 110 and cartridge 160.

Figure 3A:
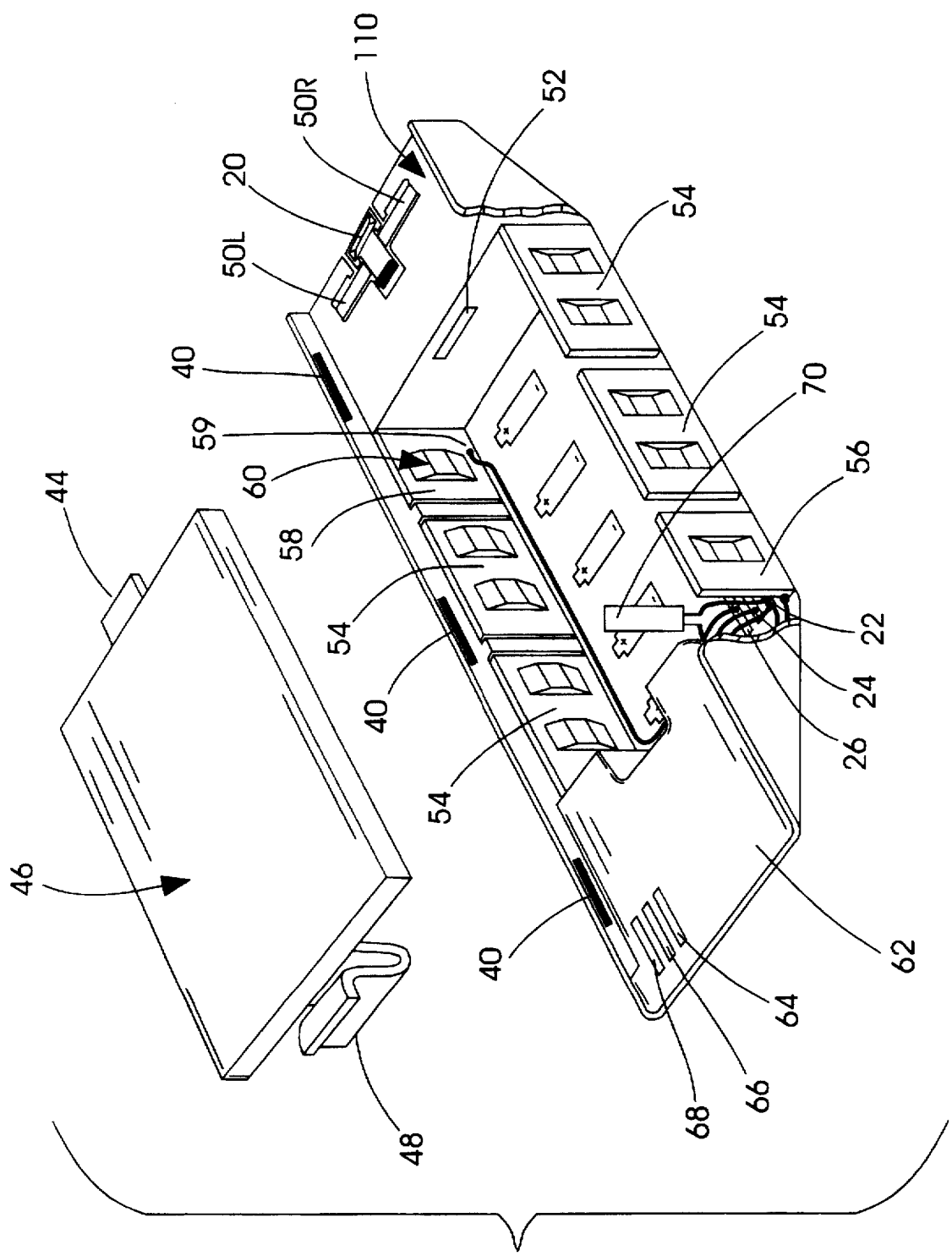
FIG. 3A is a perspective view of the bottom of the preferred embodiment of the invention with the battery box cover removed.
Figure 3B:
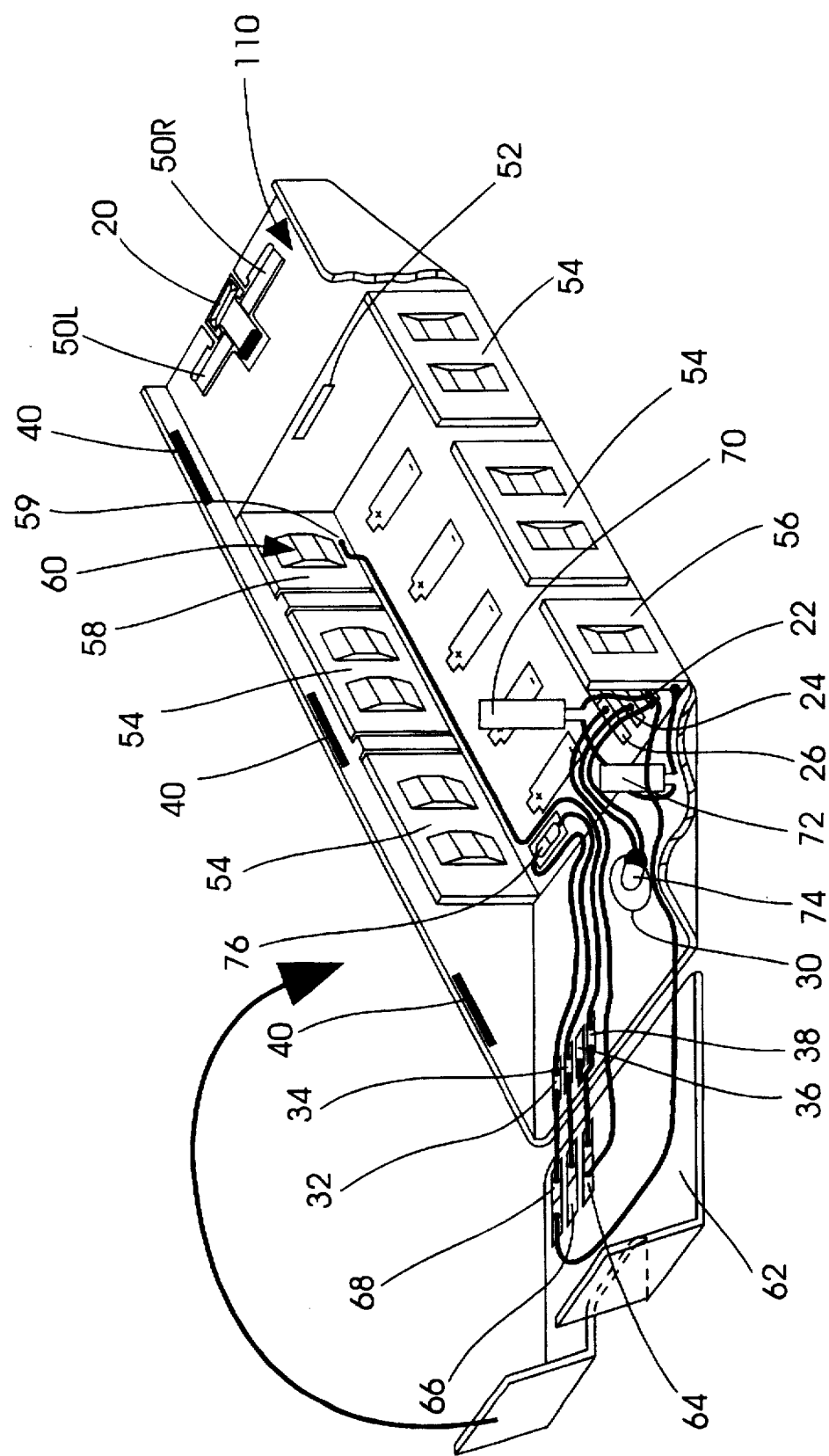
FIG. 3B is a perspective view of the bottom of the preferred embodiment of the invention with the battery cover removed and the wiring box cover laid open to show the electrical circuit.

A lens 30 shown in FIG. 1 allows light from lamp 74 shown in FIG. 3B to be focused.

The remaining items referenced in FIG. 1 are typical of those found in present Motorola MicroTac™ cellular telephone battery packs. These items are a contact 32 that provides a negative contact for an external charger, a contact 34 that provides a thermistor 76 (shown in FIG. 3B) contact for an external charger, a contact 36 that provides a positive contact for an external charger, a contact 38 that provides a second positive contact for an external charger and a lever latching device 20 used to lock battery pack 110 in place on the cellular telephone.

Reference is now directed to FIG. 3A which, is a perspective view of the bottom of the preferred embodiment of the invention 110 or the side of battery pack 110 that connects to the cellular telephone. A removable battery box cover 46 is shown removed. Battery box cover 46 comprises a clip 48 and a tab 44 for attaching battery box cover 46 to battery pack 110. Clip 48 engages a wiring box cover 62. Tab 44 slides into a slot 52. Providing a removable cover allows replacement of the standard size AA rechargeable batteries (not shown) without replacing the entire battery pack or visa versa. Alternatively clip 48 is missing and battery box cover 46 is glued to battery pack 110 thus sealing the supplied batteries within battery pack 110. Part of contacts 22, 24, and 26 are also shown in FIG. 3A. A wire 59 connects to a metal plate 58 to form the most positive battery terminal. Metal plates 54 connect the battery cells in series. A metal plate 56 forms the most negative battery terminal. The batteries are connected to the pack by contacts 60 stamped in the metal plates.

The remaining items referenced in FIG. 3A are typical of those found in present Motorola MicroTac™ cellular telephone battery packs. Lever latching device 20 comprises a plastic lever with a protective and supportive metal sleeve 50L on the left side of the center of the fulcrum and a protective and supportive metal sleeve 50R on the right side of the center of the fulcrum. A contact 64 provides a positive contact to the cellular telephone. A contact 66 provides thermistor 76 (shown in FIG. 3B) contact to the cellular telephone. A contact 68 provides a negative contact to the cellular telephone. Six elongated tabs 40 (three tabs not shown) provide a sliding means of attachment to the cellular telephone.

Reference is now directed to FIG. 3B which is a perspective view of the bottom of the preferred embodiment of the invention with the battery cover removed and the wiring box cover laid open to show the electrical circuit. Metal plate 56 connects to a first lead of a poly over current switch 72 that trips open at approximately one ampere thus providing short circuit current protection to the battery cells. A second lead of switch 72 connects to a first lead of a bimetallic over temperature switch 70 that trips open at approximately 70 degrees Celsius thus protecting the batteries from too rapid of a charge or discharge. A second lead of switch 70 connects to contact 22 and a first lead of lamp 74 and contact 68 and contact 32 and a first lead of thermistor 76. A second lead of lamp 74 connects to contact 24. Metal plate 58 connects to contact 64 via wire 59. Contact 64 is in turn connected to contact 36 and contact 38. Contact 34 is connected to contact 66 and to a second lead of thermistor 76 which provides battery temperature information to the charger. The thermistor and the bimatellic switch should be placed as close to the batteries as possible in order to correctly sense the batteries' temperature. Since the battery pack can be carried in a purse with keys and loose change that can short out the battery, a short circuit current protection device such as the poly switch is present in all embodiments of this invention.

Figure 4:
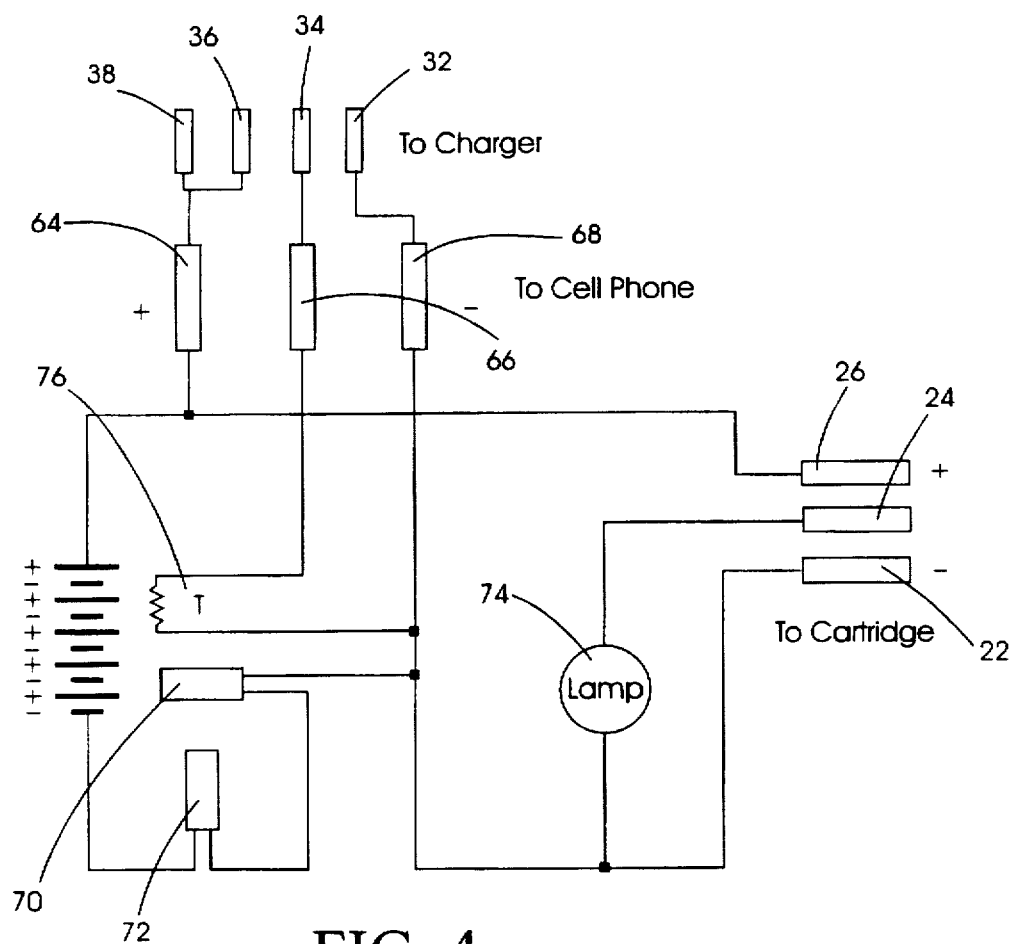
FIG. 4 is a schematic circuit diagram of the main body of the preferred embodiment of the invention.

FIG. 4 is a schematic circuit diagram of the main body of the preferred embodiment of the invention, which is battery pack 110 that fits the Motorola MicroTac™ cellular telephone. FIG. 4 shows that the batteries will be protected from excessive temperature by the bimetallic switch and all combinations of external shorts by the poly switch.

Operation of the Invention

The following description will include an operational explanation of the details previously discussed in this present invention. Reference is again directed to FIG. 2 which shows cartridges 160 being inserted into slot 28 of battery pack 110. As the cartridge slides back into its fully inserted position, contacts 22, 24, and 26 (shown in FIG. 1) contact and apply force against contacts 86, 84, and 82 (shown in FIG. 9) respectively. These contacts provides the electrical attachment means or electrical connection means for attaching the cartridge's electrical circuit to the battery pack's electrical circuit. The cartridge is held in its fully inserted position by the opposing contacts' mutual spring force which forces the cartridge in the upward direction against the top of the slot which in turn increases the slot's friction with the cartridge and thus holds the cartridge in position. This friction provides the mechanical attachment means for attaching the cartridge to the battery pack. When the cartridge shown in FIG. 9 is fully inserted, contact 82 has a positive voltage on it and contact 86 has a negative voltage on it and the cartridge can now receive power from or source power to the battery pack. When switch 80 on cartridge 160 is pressed, contact 84 on the cartridge shown in FIG. 9 and contact 26 shown in FIG. 1 receive a positive voltage which turns on lamp 74 shown in FIG. 3B.

The remaining operation of the battery pack 110 is typical of present Motorola MicroTac™ cellular telephone battery packs except that special care needs to be taken with respect to the placement of thermistor 76 and bimetallic switch 70, since the batteries are removable. Ni—Cd batteries start to liberate oxygen at about 70 degrees Celsius which is very near the bimatellic switch's protective trip open point. The battery cell pressure increases as the oxygen is internally liberated until the battery's vent pressure is reached. At this pressure, electrolyte is released from the battery. To prevent this destruction, the bimetallic switch should be placed within the battery box as close as possible to the first battery cell. If it is placed on the wall of the battery case, a thermal insulator should be placed between the bimatellic switch and the wall. The same precautions apply to the thermistor, since it senses the battery cell temperature for the charger. The charger adjusts the fast charge rate based on the temperature derived from the thermistor's resistance and also senses a battery temperature spike that signals the end of the chargers fast charge cycle.

Figure 5:
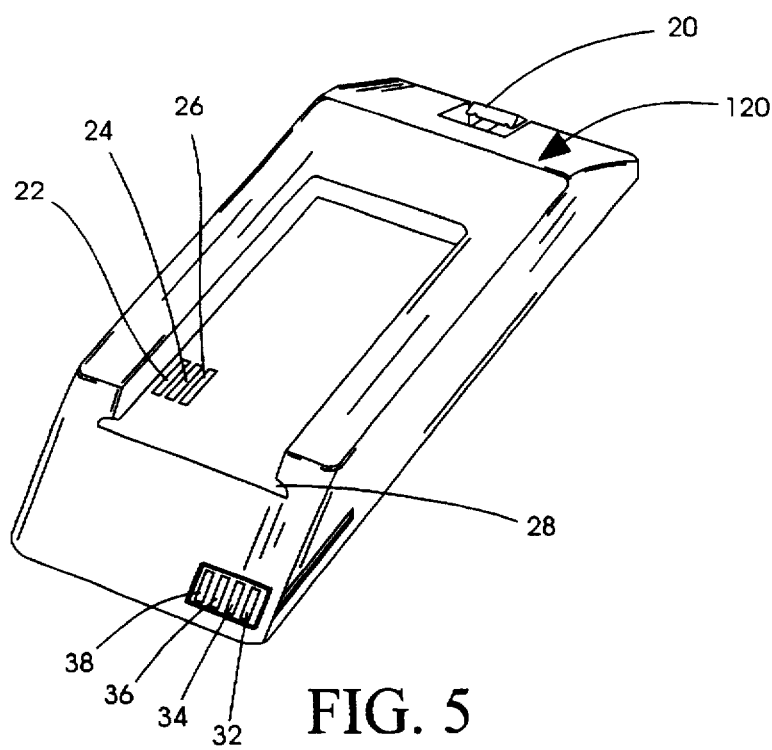
FIG. 5 is a perspective view of the main body of another embodiment of the invention that fits the Motorola Slim Pack cellular telephone.

Reference is now directed to FIG. 5 which is a perspective view of the main body of another embodiment of the invention that fits the Motorola Slim Pack cellular telephone. This embodiment of the invention is essentially the same as the preferred embodiment except that this embodiment is slimmer. Battery pack 120 is approximately one quarter to one half of an inch in thickness and uses a flat battery.

Figure 6:
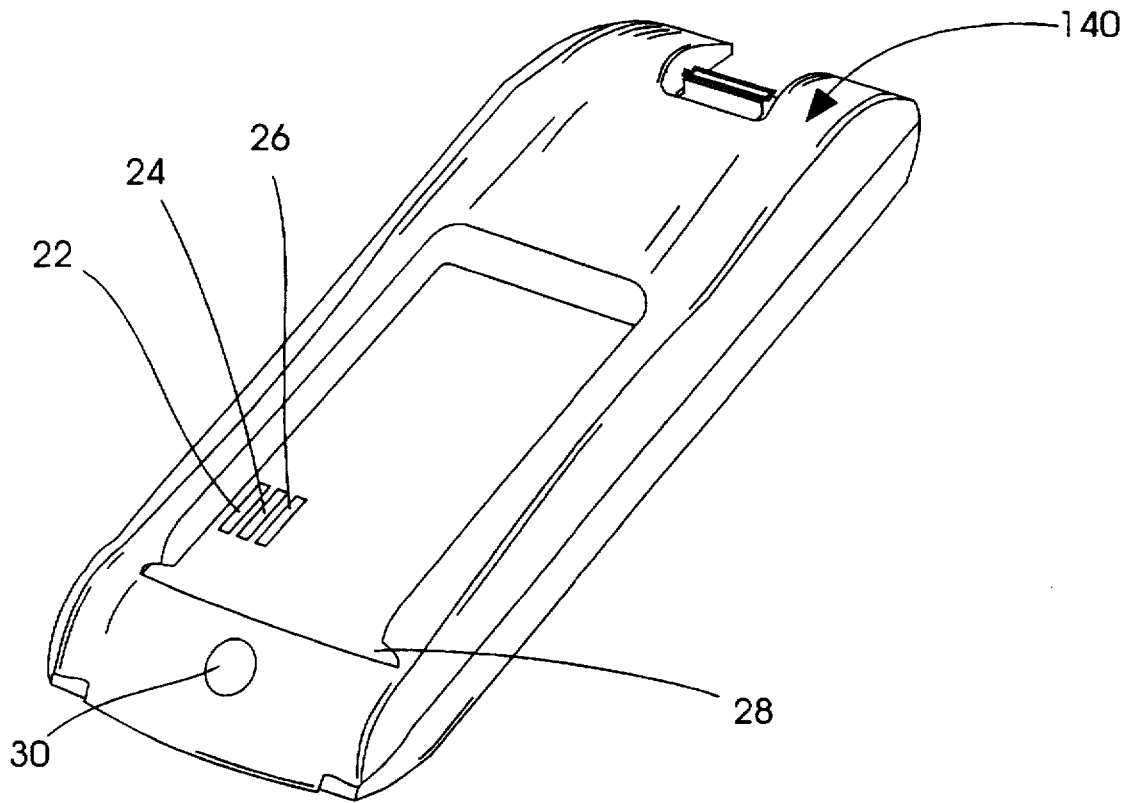
FIG. 6 is a perspective view of the main body of another embodiment of the invention that fits the Nokia model 232 cellular telephone.

Reference is now directed to FIG. 6 which is a perspective view of the main body of another embodiment of the invention that fits the Nokia model 232 cellular telephone. This embodiment of the invention is essentially the same as the preferred embodiment except that this embodiment is thinner.

Figure 7:
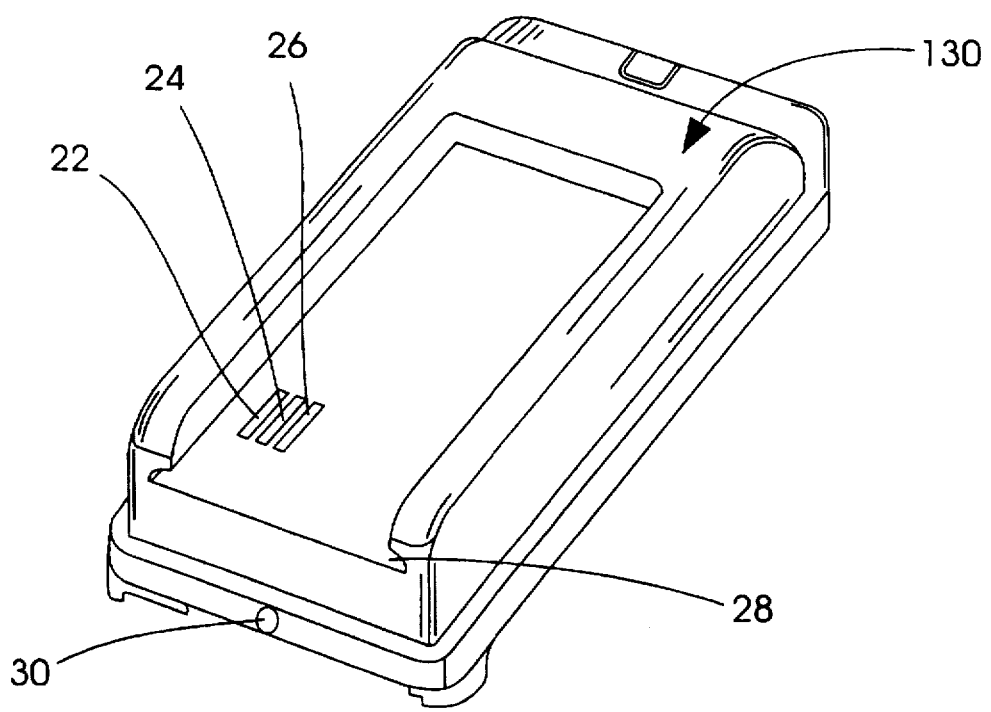
FIG. 7 is a perspective view of the main body of another embodiment of the invention that fits the Nokia model 2110 cellular telephone.
Figure 8:
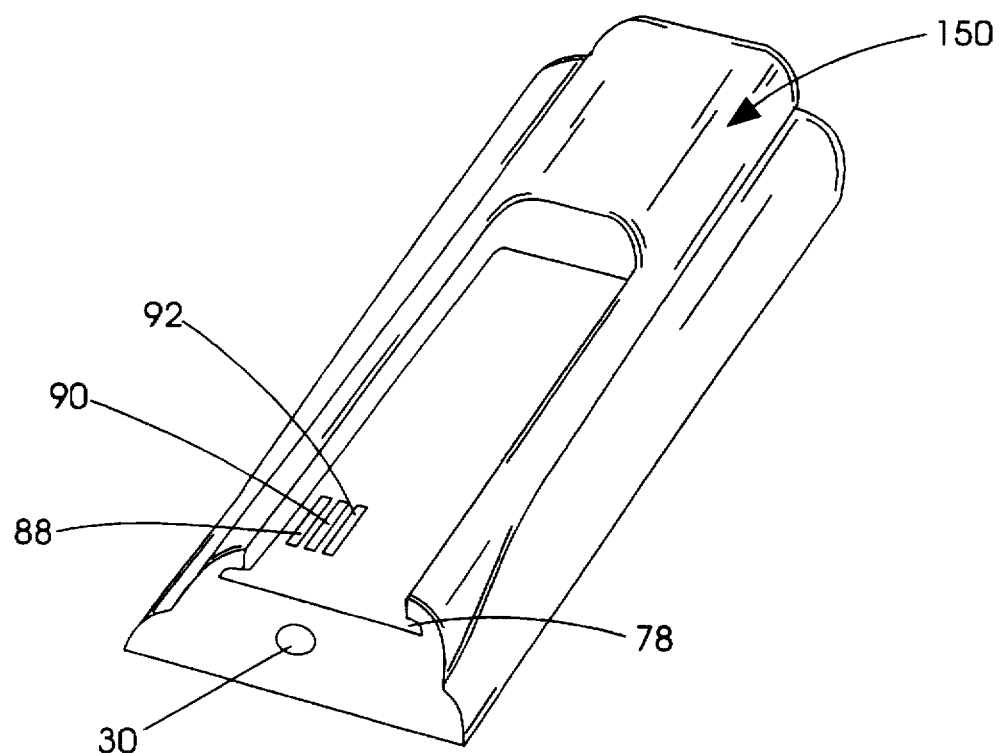
FIG. 8 is a perspective view of the main body of another embodiment of the invention that fits the Ericsson cellular telephone.

FIG. 7 shows a perspective view of the main body of another embodiment of the invention that fits the Nokia model 2110 cellular telephone. This embodiment of the invention is essentially the same as the preferred embodiment Reference is now directed to FIG. 8 which is a perspective view of the main body of another embodiment of the invention that fits the Ericsson cellular telephone. This embodiment of the invention is essentially the same as the preferred embodiment except that this battery pack 150 is sufficiently narrower than the preferred embodiment to warrant the design of a new cartridge 170 shown in FIG. 10. As cartridge 170 slides back into its fully inserted position in slot 78 in pack 150 shown in FIG. 8, contacts 88, 90, and 92 contact and apply force against contacts 100, 98, and 96 shown in FIG. 10 respectively. The cartridge is held in its fully inserted position in the same manner as the preferred embodiment.

Summary, Ramifications, and Scope

The reader will see that the battery packs of the invention provide a low cost, light weight, small and environmentally sound apparatus as well as an efficient method for providing the user with a wide variety of useful functions. These functions are kept within easy reach (several cartridges can be kept in pocket or purse). The cartridges can be quickly changed or interchanged with battery packs on cellular telephones, other portable personal communication devices and other devices with battery packs. The invention typically separates the battery from the battery pack which is separated from the cartridge so that when one of the components is disposed of, the other components are not wasted.

While the above description contains many specifics, this should not be construed as limitations on the scope of the invention, but rather as an exemplification of a few embodiments of it. Many other variations are possible for example, adding latches or other devices to hold the cartridge in place for environments subject to intense vibrations or accelerations. Another example would be battery packs and cartridges that use smaller footprints (these are virtually certain to be needed in the future). Further examples would be battery packs designed for digital cellular phones, other models of cellular telephones, other manufactures of cellular telephones, European GSM digital cellular telephones, cordless phones, walkie-talkies, pagers, PCS devices, and other personal communication devices. An example of related additional equipment required for the operation of a cartridge would be the addition of an external connector to connect the cartridge to the telephone circuit board. This connector is needed in a combination silent ring vibrator/ answering machine/recorder that maybe one of the early commercial applications of this invention. Accordingly, the scope of the invention should be determined not by the embodiments illustrated, but by the appended claims and their legal equivalents.

Many alterations and modifications may be made by those having ordinary skill in the art without departing from the spirit and scope of the invention. Therefore, it must be understood that the illustrated embodiments have been set forth only for the purposes of example and that they should not be taken as limiting the invention as defined by the following claims.

I claim:

1. A battery pack used for coexistent attachments to a primary device and a smaller interchangeable supplemental function, comprising:

a removably attached interchangeable supplemental device cartridge comprising at least one supplemental function means, said interchangeable supplemental device cartridge being smaller in size and weight than said primary device, a battery pack main body comprising a primary device attachment means for attachment to said primary device and further comprising a variable number of attachment means for removably attaching battery charging, battery monitoring and, battery protecting circuits, and a supplemental device attachment means for attaching said interchangeable supplemental device cartridge to said battery pack main body, whereby said interchangeable supplemental device cartridge's functions can be interchanged with different functions by interchanging said interchangeable supplemental device cartridge.

2. The battery pack of claim 1 wherein said battery pack is a cellular telephone battery pack.

3. The battery pack of claim 1 wherein said supplemental device attachment means is mechanical.

4. The battery pack of claim 1 wherein said supplemental device attachment means is electrical.

5. The battery pack of claim 1 wherein said interchangeable supplemental device cartridge comprises said supplemental device attachment means.

6. The battery pack of claim 1 wherein said battery pack main body comprises said supplemental device attachment means.

7. The battery pack of claim 1 wherein said supplemental function means is electrical.

8. The battery pack of claim 1 wherein said supplemental function means is mechanical.

9. The battery pack of claim 1 wherein said battery pack main body further comprises said supplemental device attachment means and said supplemental device attachment means comprises a supplemental device cartridge loading section into which said interchangeable supplemental device cartridge is loaded, and electrical circuits in said battery pack main body are connected to electrical circuits in said interchangeable supplemental device cartridge through said supplemental device cartridge loading section.

10. In a battery pack having a main body and primary device attachment means to provide attachment to a primary device and further comprising a variable number of attachment means for removably attaching battery charging, battery monitoring and, battery protecting circuits, the improvement comprising:

a removably attached interchangeable supplemental device cartridge comprising at least one supplemental function means, said interchangeable supplemental device cartridge being smaller in size and weight than said primary device, and a supplemental device attachment means for attaching said interchangeable supplemental device cartridge to said main body coexistent with said attachment to said primary device, whereby said interchangeable supplemental device cartridge's functions can be interchanged with different functions by interchanging said interchangeable supplemental device cartridge.

11. The battery pack of claim 10 wherein said battery pack is a cellular telephone battery pack.

12. The battery pack of claim 10 herein said supplemental device attachment means is mechanical.

13. The battery pack of claim 10 wherein said supplemental device attachment means is electrical.

14. The battery pack of claim 10 wherein said battery pack is a cellular telephone battery pack with its said main body further comprising said supplemental device attachment means and said supplemental device attachment means comprising a supplemental device cartridge loading section into which said interchangeable supplemental device cartridge is loaded, and electrical circuits in said battery pack main body are connected to electrical circuits in said interchangeable supplemental device cartridge through said supplemental device cartridge loading section.

* * * * *